UNITED STATES PATENT OFFICE.

EDWIN L. HALL, OF ZANESVILLE, OHIO.

IMPROVEMENT IN PROCESSES OF MANUFACTURING TILES.

Specification forming part of Letters Patent No. 159,093, dated January 26, 1875; application filed October 8, 1874.

*To all whom it may concern:*

Be it known that I, EDWIN L. HALL, of Zanesville, in the county of Muskingum and State of Ohio, have invented certain new and useful Improvements in Process of Manufacturing Tiles; and I do hereby declare the following to be a full, clear, and exact description of the invention, such as will enable others skilled in the art to which it pertains to make and use it, reference being had to the accompanying drawings, which form part of this specification.

My invention relates to a process for the manufacture of tiles for flooring, wainscoting, &c.; and consists in the process, hereinafter specified, of utilizing raw crude clay as it comes from the bank, and, without any previous treatment or admixture, forming and molding the same into tiles of the desired pattern.

My process is as follows: The raw crude clay, when taken from the bank, is allowed to dry, when it is taken and pressed in suitable forms or molds, without the admixture of water or any other substance, unless it be some pigments, when colored or ornamental tiling is to be made. After the clay, as afore-mentioned, has been pressed into its form or mold by any suitable means, it is baked in a potter's oven in the usual well-known manner. Should it be desired to manufacture figured or vari-colored tiling, the mold is divided by very thin partitions into any desired figure—as, for instance, a star—and into the separate divisions or compartments formed by these partitions in the mold, clay, as heretofore mentioned, impregnated with different colors, is placed, after which the partitions forming the figure are carefully withdrawn and the contents of the mold pressed in any suitable manner, and afterward subjected to baking in the same way as heretofore specified. If in impregnating the clay with any pigment, or if by any other reason the clay should be wet or moist, it must be thoroughly dried before being subjected to pressure; and by my operation, as hereinbefore set forth, I avoid the shrinkage and warping, as well as the labor and time, and consequent waste and expense attendant upon the customary process of tile-making, wherein water is added to render clay plastic, or in that condition technically known among potters as "slip." If a smoother or more polished surface in the finished tile be desired, the raw clay may be reduced to a finer state of granulation, as may be required before it is subjected to the mold.

What I claim as my invention is—

1. The process herein described of manufacturing tiles, consisting of taking clay crude from the bank, and when dry subjecting it directly to suitable pressure in proper molds or forms, and afterward baking the same, substantially as described.

2. The process herein described of manufacturing figured or vari-colored tiles by pressing dry clay, impregnated with the desired pigments, into molds, wherein the desired figure is marked out and defined by a thin partition, whereby the mold is sub-divided into compartments, into which vari-colored clays are introduced, after which the figured partition is withdrawn before the dry and vari-colored clays are pressed into a solid mass and afterward baked.

In testimony that I claim the foregoing I have hereunto set my hand this 8th day of October, 1874.

EDWIN L. HALL.

Witnesses:
LEVERETT L. LEGGETT,
J. TYLER POWELL.